J. T. HARVEY.
Sraw Cutter.
No. 71,000.  Patented Nov. 19, 1867.
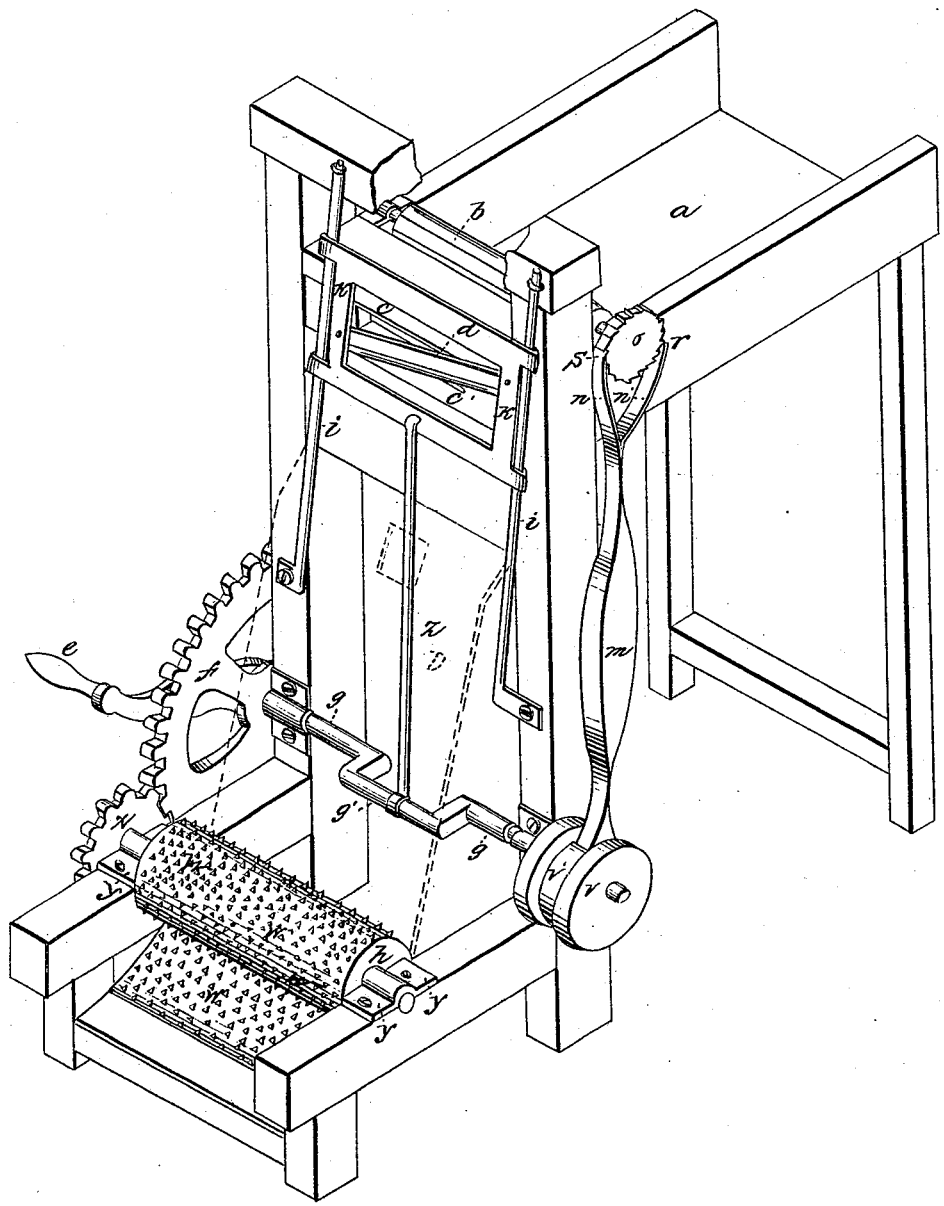
Witnesses:
Allan C. Bakewell
W. D. Lewis.
Inventor:
James T. Harvey.
by Bakewell & Christy
his Attorneys.

United States Patent Office.

JAMES T. HARVEY, OF MURRYSVILLE, PENNSYLVANIA.

Letters Patent No. 71,000, dated November 19, 1867.

IMPROVEMENT IN STRAW-CUTTERS.

*The Schedule referred to in these Letters Patent and making part of the same.*

TO ALL WHOM IT MAY CONCERN:

Be it known that I, JAMES T. HARVEY, of Murrysville, in the county of Westmoreland, and State of Pennsylvania, have invented a new and useful Improvement in Apparatus for Cutting Feed for Stock; and I do hereby declare the following to be a full, clear, and exact description thereof, reference being had to the accompanying drawing making a part of this specification, which is a perspective view of my feed-mill and cutter, with the frame-work removed which covers the front.

The nature of my invention consists in the construction and combination of improved apparatus for cutting vegetable products, so as the better to fit them for use in feeding stock.

To enable others skilled in the art to make and use my invention, I will proceed to describe its construction and mode of operation.

The feed-cutter box $a$ is of the usual form and construction, also the feed-rollers $b$. At the mouth or front of the box I insert two metallic plates, usually of steel, one, $c$, in the top of the box, and the other, $c'$, at the bottom, and so adjust them and the double-edged knife $d$ to each other that as the latter plays up, its upper edge will cut the straw, stalks, or other material fed in from the box, against or across the front edge of the upper plate $c$, while with its downward stroke its lower edge will make a similar cut across the front edge of the lower plate $c'$. The outer face of the knife $d$ is of course bevelled or convex, and its inner surface flat or concave. The knife receives its motion from the crank $e$, through the wheel $f$, shaft $g$ and crank $g'$. To secure a feeding movement for each stroke of the knife $d$, as above described, I attach a cam, $l$, fitted with a collar, $l'$, to the shaft $g$, and by this work a ratchet device, consisting of the bar $m$, bifurcated near its upper end, forming the two arms $n\ n'$, which play into the toothed ratchet-wheel $o$, attached to the feed-roller $b$. As the cam $l$ drives the bar $m$ upwards, the arm $n$, playing against the teeth of the wheel $o$, gives it a partial revolution. The other arm $n'$ has a hook, $r$, at its extreme end, which, catching on the teeth of the roller or wheel $o$, when the cam $l$ causes a downward movement, continues the rotary motion of the feed-roller $b$, so that with each revolution of the shaft $g$, I secure two cuts with the knife $d$, and two feeding movements of the feed-rollers $b$ to correspond. Some vegetable products, to adapt them for feeding purposes, need to be cut finer, or in shorter sections, than others. To adapt my feeding apparatus for feeding a greater or less length forward between the plates $c$ and $c'$ for the action of the knife $d$, I make the ends of the arms $n$ and $n'$ adjustable, fastening them by screws $s$ or other equivalent device, so as, when desirable, to shorten the arms $n\ n'$ and make them operate more nearly in a tangential line to the circumference of the ratchet-wheel $o$ at the point of contact, whereby the greatest amount of motion will be communicated to the wheel $o$ and feed-rollers $b$. When the material to be cut is of a coarser quality, such as corn-stalks, ears of corn, etc., I lengthen slightly the arms $n\ n'$ by the adjustable ends, as above described, so that, working at an acute angle to the radii of the ratchet-wheel $o$ at the point of contact, less motion will be imparted to it, and through it to the feed-roller $b$. Motion may be communicated from one feed-roller to the other—one being in the top, and the other in the bottom of the box—by cog-wheels (not shown in the drawing) at their further ends, or by other equivalent device. The knife $d$ is set usually at an angle in the sliding frame or sash $k$, which plays on the guide-rods $i\ i$. To secure for the knife $d$ a slicing stroke, and thereby render it more easy of operation, I incline slightly the guide-rods $i\ i$ in either direction in the plane of the knife edges, but usually in the same direction as the slant of the knife $d$. By this means the different parts of the edges of the knife $d$ cut successively from end to end, and with an oblique slicing stroke, which adds much to its efficiency.

As advantages, I claim cutting with both the upward and downward strokes of the knife, whereby I accomplish the most work with a given amount of motion; that I do the work easier by setting the knife at an angle, and operating it in a sash which plays on the inclined guide-rods $i\ i$, whereby I secure a slicing stroke; that my machine, by its mode of adjusting the feed, is adapted to cut vegetable products of all kinds, and fit the same for use as feed for stock. I apply my invention to cutting not only hay, straw, corn-stalks, etc., but also ears of corn and other vegetable products. It is calculated to do any work for which such machines are ordinarily used. When desirable, I operate my invention by horse, or steam, or other mechanical power, connecting it therewith by any of the appliances for such purpose in common use.

I do not limit myself to the particular form of the knife $d$, shown in the drawings, as I use in the cutter described any form of double-edged knife in ordinary use, or in lieu thereof two knives set parallel, or nearly so, the upper one to cut with the upward stroke and the lower one with the downward stroke.

Having described my improvement, what I claim as my invention, and desire to secure by Letters Patent, is—

The double-edged knife $d$, attached by a sash or otherwise to the inclined guide-rods $i\ i$, in combination with the metallic plates or edges $c\ c'$, and bifurcated ratchet-bar $m$, with adjustable arms $n\ n'$, constructed and operated substantially as and for the purposes above set forth.

In testimony whereof, I, the said JAMES T. HARVEY, have hereunto set my hand in presence of—

J. T. HARVEY.

Witnesses:
GEO. H. CHRISTY,
A. S. NICHOLSON.